(12) United States Patent
Döge et al.

(10) Patent No.: US 11,294,687 B2
(45) Date of Patent: Apr. 5, 2022

(54) DATA BUS WITH MULTI-INPUT PIPELINE

(71) Applicant: Fraunhofer-Gesellschaft zur Förderung der angewandten Forschung e.V., Munich (DE)

(72) Inventors: Jens Döge, Dresden (DE); Christoph Hoppe, Dresden (DE); Peter Reichel, Laußnitz (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 58 days.

(21) Appl. No.: 16/881,205

(22) Filed: May 22, 2020

(65) Prior Publication Data
US 2020/0348942 A1 Nov. 5, 2020

Related U.S. Application Data

(63) Continuation of application No. PCT/EP2017/081743, filed on Dec. 6, 2017.

(30) Foreign Application Priority Data

Nov. 24, 2017 (EP) .................... 17203607

(51) Int. Cl.
*G06F 9/38* (2018.01)
*G06F 5/08* (2006.01)
*G06F 13/42* (2006.01)

(52) U.S. Cl.
CPC ............. *G06F 9/3871* (2013.01); *G06F 5/08* (2013.01); *G06F 9/3887* (2013.01); *G06F 13/4252* (2013.01)

(58) Field of Classification Search
CPC .... G06F 15/82; G06F 15/825; G06F 15/8007; G06F 5/08; G06F 5/065; G06F 9/3871; G06F 9/3887; G06F 13/4252
See application file for complete search history.

(56) References Cited

U.S. PATENT DOCUMENTS

| | | | |
|---|---|---|---|
| 5,758,139 A | 5/1998 | Sutherland et al. | |
| 6,085,316 A | 7/2000 | Sutherland et al. | |
| (Continued) | | | |

FOREIGN PATENT DOCUMENTS

| | | | | |
|---|---|---|---|---|
| WO | WO-2007029168 A2 | * | 3/2007 | ............... G06F 5/08 |
| WO | WO-2009060260 A1 | * | 5/2009 | ........... G06F 9/3871 |
| (Continued) | | | | |

OTHER PUBLICATIONS

Raphael Berner, Christian Brandli, Minhao Yang, S-C Liu, and Tobi Delbruck. A 240×180 120db 10mw 12us-latency sparse output vision sensor for mobile applications. In IEEE International Image Sensor Workshop, No. EPFL-CONF-200451, pp. 41-44, 2013.

(Continued)

*Primary Examiner* — Courtney P Carmichael-Moody
(74) *Attorney, Agent, or Firm* — McClure, Qualey & Rodack, LLP

(57) ABSTRACT

A data bus includes process elements and a linear main pipeline. Each process element is coupled to a linear pipeline having M stages arranged in series, each of the M stages including a buffer element configured to buffer a data bit sequence and to forward the buffered data bit sequence from a first of the buffer elements to a last of the buffer elements. The linear main pipeline includes N pipeline stage elements arranged in series. Each pipeline stage element is connected to the last buffer element of a respective linear pipeline and configured to read-out one or more of the buffered data bit sequences and to forward the read-out data bit sequences (Continued)

from one of N pipeline stag elements to a next of the N pipeline stage elements.

30 Claims, 14 Drawing Sheets

(56) References Cited

U.S. PATENT DOCUMENTS

| | | | |
|---|---|---|---|
| 6,856,270 B1 * | 2/2005 | Farmer | G06F 5/08 |
| | | | 341/161 |
| 2015/0149718 A1 | 5/2015 | Nakamura et al. | |

FOREIGN PATENT DOCUMENTS

| | | |
|---|---|---|
| WO | 2011078812 A1 | 6/2011 |
| WO | 2019101350 A1 | 5/2019 |

OTHER PUBLICATIONS

Gaozhan Cai, Bart Dierickx, Bert Luyssaert, Nick Witvrouwen, and Gerlinde Ruttens. Imaging sparse events at high speed. In IEEE International Image Sensor Workshop, 2015.

Jens Döge, Christoph Hoppe, Peter Reichel, and Nico Peter. A 1 megapixel hdr image sensor soc with highly parallel mixed-signal processing. In IEEE International Image Sensor Workshop, 2015.

A Dupret, B Dupont, M Vasiliu, B Dierickx, and A Defernez. Cmos image sensor architecture for high-speed sparse image content readout. In IEEE International Image Sensor Workshop, pp. 26-28, 2009.

Michael J Flynn. Very high-speed computing systems. Proceedings of the IEEE, 54(12):1901-1909, 1966.

Yu Liu, Xuguang Guan, Yang Yang, and Yintang Yang. An asynchronous low latency ordered arbiter for network on chips. In 2010 Sixth International Conference on Natural Computation, vol. 2, pp. 962-966. IEEE, 2010.

Steven M Nowick and Montek Singh. High-performance asynchronous pipelines: an overview. IEEE Design & Test of Computers, 28(5):8-22, 2011.

Montek Singh and Steven M Nowick. High-throughput asynchronous pipelines for fine-grain dynamic datapaths. In Advanced Research in Asynchronous Circuits and Systems, 2000.(ASYNC 2000) Proceedings. Sixth International Symposium on, pp. 198-209. IEEE, 2000.

Montek Singh and Steven M Nowick. The design of high-performance dynamic asynchronous pipelines: high-capacity style. IEEE Transactions on Very Large Scale Integration (VLSI) Systems, 15(11): pp. 1270-1283, 2007.

Montek Singh and Steven M Nowick. The design of high-performance dynamic asynchronous pipelines: lookahead style. IEEE Transactions on Very Large Scale Integration (VLSI) Systems, 15(11): pp. 1256-1269, 2007.

J. Sparso. Asynchronous circuit design—a tutorial. Chapters 1-8 in Principles of asynchronous circuit design—A systems Perspective, pp. 1-152, 2006.

ISR and Written Opinion, dated Apr. 3, 2018 from PCT/EP2017/081743.

IPRP (international report on patentability) with annex, dated Nov. 25, 2019 from PCT/EP2017/081743.

* cited by examiner

| pipeline design | cycle time tb ns | throughput in giga items per sec. | logic style | process node |
|---|---|---|---|---|
| PS0 [10] | 1.98 | 0.51 | static | 0.18μ HP |
| LPsr2/2 [10] | 0.76 | 1.31 | dynamic | 0.18μ HP |
| LPsr2/2 [10] | 0.65 | 1.55 | dynamic | 0.18μ HP |
| HC [9] | 0.57 | 1.75 | dynamic | 0.18μ HP |
| this work | 1.1 | 0.91 | static | 0.18μ LP |

Fig. 12

DATA BUS WITH MULTI-INPUT PIPELINE

CROSS-REFERENCE TO RELATED APPLICATIONS

This application is a continuation of copending International Application No. PCT/EP2017/081743, filed Dec. 6, 2017, which is incorporated herein by reference in its entirety, and additionally claims priority from European Application No. 17203607.1, filed Nov. 24, 2017, which is also incorporated herein by reference in its entirety.

Embodiments of the present invention relate to a data bus and a method for controlling same. Embodiments relate to a high speed asynchronous multi input pipeline for compaction and transfer of parallel SIMD data.

BACKGROUND OF THE INVENTION

Image sensors with programmable, highly parallel signal processing, so called Vision Systems on Chip, allow for performing computationally expensive tasks directly on the sensor itself. Therefore, it is possible to limit the amount of output data to relevant features only. Thus, the output is not necessarily an image, but e.g. the position and distinctive properties of certain features within the image. Reading out such features presents a major challenge, since the position and number of features is not known. Typically, the number of features, as well as their position and time of occurrence, are unknown. In the literature, a variety of sensors have been proposed, which are optimized specifically for event-based readout and, in most cases, provide parallelism on pixel level [1], [2], [4]. In order to facilitate feature-based readout, the readout path, instead of being restricted to scanning data sequentially, is to be capable of reacting to and propagating events. The Vision System on Chip (VSoC) presented by Doge et al. [3] makes use of a conventional synchronous bus to readout column-parallel data from a Single Instruction Multiple Data (SIMD) [5] unit. Operating at a frequency of up to 100 MHz, it allows for sequential data readout of either all columns of the SIMD array, or at least a consecutive area. However, extracting features may result in sparse data and continuous data streams with varying word length. This is why such an approach does not work for certain applications, especially if only a few of the SIMD unit's processor elements actually supply any data. Readout schemes proposed in the literature are based on either continuous data streams, or spatially encoded events, but there is no system that may be applied in both scenarios alike. Conventional synchronous buses as well as special event-based readout paths are unsuitable for such a system, since both continuous data, e.g. complete images, and sparse data like feature coordinates, should be transferred. Therefore, there is the need for an improved approach.

SUMMARY

According to an embodiment, a data bus may have: process elements, each process element coupled to a linear pipeline having M stages arranged in series, each of the M stages including a buffer element configured to buffer a data bit sequence and to forward the buffered data bit sequence from a first of the buffer elements to a last of the buffer elements; and a linear main pipeline including N pipeline stage elements arranged in series, wherein each pipeline stage element is connected to the last buffer element of a respective linear pipeline and configured to read out one or more of the buffered data bit sequences and to forward the read-out data bit sequences from one of N pipeline stage elements to a next of the N pipeline stage elements; wherein each pipeline stage element is configured to perform the reading-out sequentially; and wherein the pipeline stage element is configured to read-out all buffered data bit sequences from the respective last of the buffer elements before forwarding another data bit sequence from a previous of the N pipeline stage elements such that a continuous data stream is generated by the linear main pipeline forwarding the read-out data bit sequences; and/or wherein the pipeline stage element is configured to forward all data bit sequences from the previous of the N pipeline stage elements before reading-out another data bit sequence from the respective last buffer element such that a continuous data stream is generated by the linear main pipeline forwarding the read-out data bit sequences.

According to another embodiment, a method for controlling an inventive data bus may have the steps of: reading-out all buffered data bit sequences or a predefined number of data bit sequences from the respective last of the buffer elements before forwarding another data bit sequence from a previous of the N pipeline stage elements; and/or forwarding data bit sequences from the previous of the N pipeline stage elements before reading-out another data bit sequence from the respective last buffer element; to the reading-out is performed sequentially; and wherein the pipeline stage element is reads-out all buffered data bit sequences from the respective last of the buffer elements before forwarding another data bit sequence from a previous of the N pipeline stage elements such that a continuous data stream is generated by the linear main pipeline forwarding the read-out data bit sequences; and/or wherein the pipeline stage element forwards all data bit sequences from the previous of the N pipeline stage elements before reading-out another data bit sequence from the respective last buffer element such that a continuous data stream is generated by the linear main pipeline forwarding the read-out data bit sequences.

Another embodiment may have a non-transitory digital storage medium having a computer program stored thereon to perform the inventive method for controlling a data bus when said computer program is run by a computer.

An embodiment provides a data bus comprising process elements and a linear main pipeline. Each process element is coupled to a linear pipeline having M stages arranged in series. Each of the M stages comprises a buffer element configured to buffer a data bit sequence and to forward the buffered data bit sequence from a first of the buffer elements to a last of the buffer elements. The linear main pipeline comprises N pipeline stage elements arranged in series. Each pipeline stage element is connected to the last buffer element of a respective linear pipeline and configured to read out one of the buffered data bit sequences and to forward the read-out data bit sequence from one of N pipeline stage elements to a next of the N pipeline stage elements.

An embodiment provides a readout path based on an asynchronous pipeline, which supports both readout modes with high speed. The present invention is based on the principal, that a data bus or a read-out path can be formed by two different entities. The first entities are the so-called pipeline stage element forming the main pipeline having N stages. Each stage comprises one pipeline stage element which is configured to forward data from the previous pipeline stage element or from a linear pipeline assigned to the respective stage and coupled to the pipeline stage element. N linear pipelines form the second entities of the data bus, wherein one linear pipeline is assigned to one pipeline stage element. According to an embodiment, the logic of the pipeline stage element is, that same forwards data to the subsequent pipeline stage element (if the subsequent pipeline stage element is ready to receive data) from the same input, i.e. from the previous pipeline stage element or from the linear pipeline, as long as it receives data via the respective input. Along the main linear pipeline comprising the N stages, each pipeline stage element servers as a buffer. Analogously, along the linear pipeline, the linear pipeline serves as a buffer, since same comprises N stages of buffer elements. Due to this operating approach, continuous data and sparse data can be read-out with low latency and high speed, since the used operation mode enables to generate a continuous data flow independent from the data source. The presented method has the advantage that, by serialization, allows arbitrary data word widths without storing any control information within the data stream.

According to embodiments, the pipeline stage elements perform the reading-out of the linear pipelines and/or of the previous pipeline stage elements sequentially. This means that each pipeline stage element reads-out all buffered data bit sequences from the respective last of the buffer elements before forwarding another data bit sequence from a previous of the N pipeline stage elements or, vice versa, to forward all data bit sequences from the previous of the N pipeline stage elements before reading-out another data bit sequence from the respective last buffer element. Due to this approach, a continuous data stream can be generated by the linear main pipeline. Just for the sake of completeness, it should be mentioned that according to embodiments, each pipeline stage element comprises a first data input for receiving a data bit sequence from a previous pipeline stage element and a second data input for receiving a data bit sequence from the last buffer element. In order to control the data flow, the pipeline stage elements may be configured to switch between the two inputs.

According to embodiments, the pipeline stage elements are asynchronous pipeline stage elements, wherein two subsequent pipeline stage elements are configured to perform a so-called handshake procedure in order to initiate the forward of a data bit sequence or in order to indicate the ability to receive a data bit sequence to be forwarded from a previous pipeline stage element. This handshaking procedure may be performed, according to embodiments, by a controller of the pipeline stage element. In detail, each pipeline stage element may be formed by a latch and a controller controlling the latch and especially the data flow. For example, the latch may be a latch or a latch comprising a multiplexer. According to an embodiment, the latch may be formed by two differential pairs of transistors and two feedback inverters. The data inputs of the last buffer element are connected to the gate contacts of the transistors of the first differential pair, wherein data inputs of the previous pipeline stage element are connected to gate contacts of the transistors of the second differential pair. Data outputs are connected to the drain contacts of the first and the second differential pairs, wherein a control input is connected to the source contacts of the transistors. Here it should be noted, that the principle structure of the buffer element is quite similar, since same comprises, according to embodiments, a latch and a controller for controlling the latch and especially the data flow. The latch of the buffer is less complex, since same may, for example, comprise just a differential pair of transistors and two feedback inverters. Data inputs are connected to get contacts of the transistors, wherein data outputs are connected to drain contacts. A control input is connected to the source contacts of the transistors.

According to embodiments, the buffer controller, which is typically connected to the subsequent or previous buffer controller, may be implemented by a first asymmetrical C-element and a second asymmetrical C-element. Here, the first asymmetrical C-element may comprise two positive and two negative inputs, wherein the second asymmetrical C-element may comprise one positive and one neutral input and an inverted output.

According to embodiments, the buffer controller comprises a first input for receiving the signal from a previous buffer element indicating a data bit sequence to be forwarded and a second input forwarded for receiving a signal from a subsequent buffer element indicating the ability to receive a data bit sequence. The buffer controller further comprises a first output outputting a signal indicative for the ability to receive a data bit sequence to be forwarded and a second output outputting a signal indicative for the demand to forward a data bit sequence. According to an embodiment, the second asymmetrical C-element is connected with its neutral input to the second output and with its positive input to the second input, wherein the first asymmetrical C-element is connected with its negative input to an output of the second asymmetrical C-element and with its positive input to the first input and with its output to the second output. According to a further embodiment, the buffer controller may comprise a delay element, which may be arranged between the output of the first asymmetrical C-element and the second output. Additionally, the buffer controller may comprise an inverter element arranged between the output of the first asymmetrical C-element and the first output.

The pipeline controller may, according to embodiments, be formed by a first asymmetrical C-element and a second asymmetrical C-element. The first asymmetrical C-element may comprise two positive and two negative inputs, wherein the second asymmetrical C-element comprises one positive, one neutral input and an inverted output. According to embodiments, the pipeline controller comprises a first input for receiving a signal from a previous pipeline stage element indicating a data bit sequence to be forwarded, a second input for receiving a signal from a subsequent pipeline stage element indicating the ability to receive a data bit sequence and a third input to receive a signal from the last buffer element indicating a data bit sequence to be read-out. The pipeline controller further comprises a first output outputting a signal indicative for the ability to receive a data bit sequence to be forwarded and a second output outputting a signal indicative for the demand to forward a data bit sequence as well as a third output outputting a signal indicative for the ability to read-out a data bit sequence. According to embodiments, the second asymmetrical C-element is connected with its neutral input to the second output and with its positive input to the second input. The first asymmetrical C-element is connected with its negative input to an output of the second asymmetrical C-element and with its positive input to the first input and the third input. Furthermore, it is connected with its output to the second output. The connection to the first and third input may be done using an arbiter which is configured to select the last buffer element or the previous pipeline stage element as stage resource for the data to be forwarded. According to further embodiments, the pipeline controller may comprise a delay element arranged between the first C-element and the second output. According to another embodiment, the pipeline controller comprises a third and fourth asymmetrical C-element, each having an inverted output and being connected to their respective first and third output. Here, the third and fourth C-elements are connected via the above-mentioned arbiter to the first and third input. The arbiter has the purpose to select last buffer element or the previous pipeline stage element as data source, while the third and fourth C-elements have the purpose to output a signal indicating the subsequent pipeline stage element, that data from one of the inputs can be forwarded, wherein an information from which one of the inputs is given via the signal. Regarding the pipeline stage controller it should be noted, that same may, according to further embodiments, comprise an entity having an input for the arbiter and configured to drill the latch, such that same selects the first data input or the second data input.

According to embodiments, it should be noted, that the above described principle of the pipeline stage elements having a latch and a controller can be enhanced, such that a plurality, i.e., more than three inputs can be organized.

Another embodiment provides a method for controlling a data bus. The method comprises the steps reading-out all buffered data bit sequences or a predefined number of data bit sequences from the respective last of the buffer elements before forwarding another data bit sequence from a previous of the N pipeline stage elements; and forwarding data bit sequences from the previous of the N pipeline stage elements before reading-out another data bit sequence from the respective last buffer element. The method may, according to embodiments, be performed by a computer program.

BRIEF DESCRIPTION OF THE DRAWINGS

Embodiments of the present invention will be detailed subsequently referring to the appended drawings, in which:

FIG. 12 shows a table illustrating a comparison of different asynchronous pipelines.

DETAILED DESCRIPTION OF THE INVENTION

I. Introduction

Figure 1:
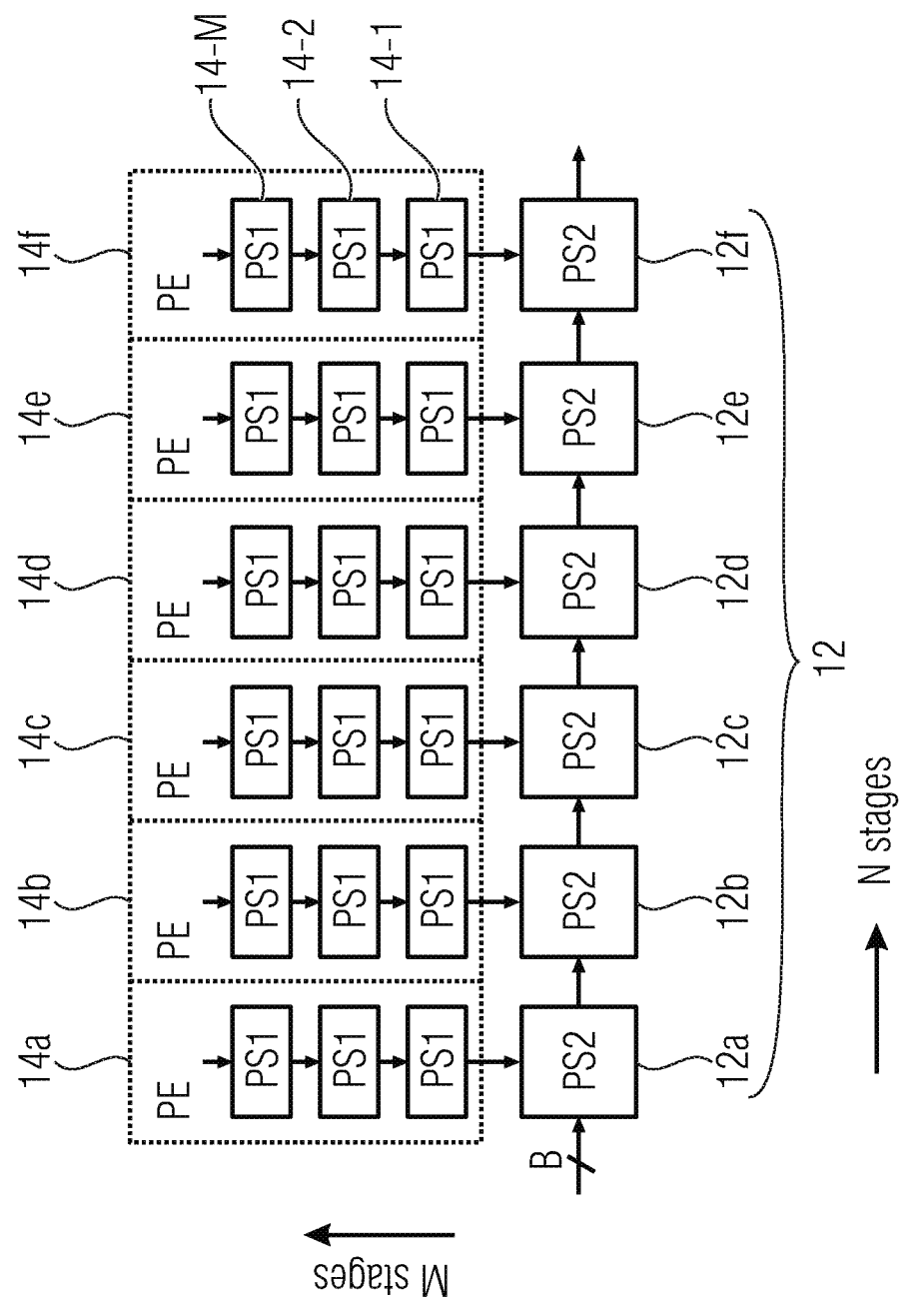
FIG. 1 shows a schematic structure of the readout path according to a basic embodiment.

The proposed asynchronous pipeline is supposed to not only enable high-speed sparse data readout, but also allows for transferring continuous data.

The detailed description is structured as follows. In Section II, the structure of the readout path is presented and certain readout modes are discussed. The hardware implementation is discussed in detail in Section III. Results of a test chip are evaluated and compared to the state of the art in Section IV. Finally, Section V provides a conclusion.

Bellow, identical reference numerals are provided to elements having identical or similar function.

II. Structure of the Readout Path

FIG. 1 shows the principle structure of the read-out path/data bus 10 which is divided into two parts. The read-out path 10 comprises N pipeline stages 12a, 12b, 12c, 12d, 12e and 12f which are arranged in series so as to form the linear main pipeline 12. The linear main pipeline 12 having N pipeline stages and running orthogonally. It should be noted, that each pipeline stage element is marked with PS2 indicating that each pipeline stage element 12a-12h has two inputs, one for the previous pipeline stage element, e.g., 12a (when looking on the pipeline stage element 12b), and one for a so-called linear pipeline marked by the reference numerals 14a-14f.

The other part of the read-out path 10 is formed by the N linear pipelines 14a to 14f which are arranged vertically to the main pipeline 12 and coupled to the respective pipeline stage elements 12a-12f. Each linear pipeline comprises M stages/M buffer elements marked by the reference numeral 14-1, 14-2, 14-M. The buffer elements are marked by PS1, since each buffer element comprises one input for the previous buffer element, e.g., 14-2 (when looking to 14-1).

The data bus 10 may be described in other words, that same is performed by a linear main pipeline 12, comprising N stages when each stage 12a-12f is coupled to another linear pipeline 14a-14f having N buffer elements so as to form a N×M matrix or, in detail, a N×M+1 matrix. Each buffer element 14-1 to 14-M may comprise a latch configured to buffer data and a controller for controlling the buffer and data flow through the element of the linear pipeline 14a-14f. The first buffer element 14-M receive a data bit sequence from a process element marked by PE and forwards the received data bit sequence up to the last buffer element 14-1, if possible. The pipeline stage elements 12a-12f may also comprise a latch as a buffer and a controller controlling the buffer and the data flow from the previous pipeline stage element or from the last buffer element 14-1 of the corresponding linear pipeline 14a-14f, since each pipeline stage element 12a-12f or, especially, the respective latch is coupled to the corresponding last buffer element 14-1.

Since now the structure of the embodiment of FIG. 1 has been described, the functionality will be discussed below. Each PE is assigned a dedicated pipeline stage with two inputs (PS2), which can take data both from the PE's local data buffer and from the previous PS2. The data bus width B is the same for all elements. In a VSoC, three readout modes are imaginable:

1) Each PE provides data. All data is read out sequentially.
2) An unknown number of PEs provides data, which is read until the pipeline no longer supplies data.
3) An unknown number of PEs provides data, which is continuously readout. Data streams from different processing steps of the PEs can mix.

The first mode is used when complete image information is to be readout. Here, each process element 12a-12f may forward all the data from the selected input up to the point, that no more data bit sequence is received. For example, the process element 12e reads out all data bit sequences stored in the buffer elements 14-1 to 14-M of the linear pipeline 14e to the stage element 12f. The pipeline stage element 12f receives the data bit sequences sequence by sequence and forwards same to next element or to an output. When the linear pipeline 14e does not have more data bit sequences, the input of the pipeline stage element 12e switches so as to receive data bit sequences from the pipeline stage element 12d. Now, all pipeline stage elements received via the pipeline stage element 12d are forwarded to the pipeline stage element 12f by the pipeline stage element 12e. Here, the data bit sequences may be received by the pipeline stage element 12d, e.g., from the previous pipeline stage element 12c or from the corresponding linear pipeline 14d.

In the second and third mode, there is sparse data, e.g. coordinates of a detected feature. These modes will be discussed with respect to FIG. 2 and FIG. 3.

Figure 2:
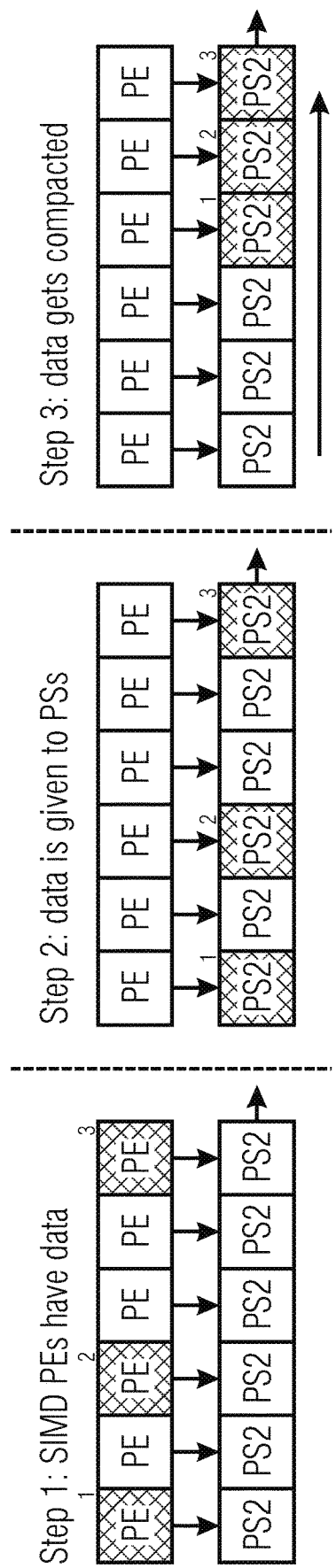
FIG. 2 illustrates schematically a readout procedure with sparse data according to an embodiment.

FIG. 2 exemplarily shows the readout process in the second case. Data provided by some PEs in the first step is transferred to the respective PS2s (step 2) and then finally compacted (step 3). The pipeline now holds a continuous data stream of unknown length, which can be readout through an interface at the end of the pipeline.

If data words of a multiple of the pipeline bit width B are to be output, the trivial solution would simply be to increase the bit width. However, this results in higher area and energy consumption, since more storage elements are needed. The bit width B should thus be selected in such a way that minimal data throughput requirements are met. Given a fixed bit width B, larger word widths (2B, 3B, etc.) are serialized before being readout as packets. For this purpose, each PE stores up to M elements in its local buffer, which then remain contiguous during the transfer to the readout path.

Figure 3:
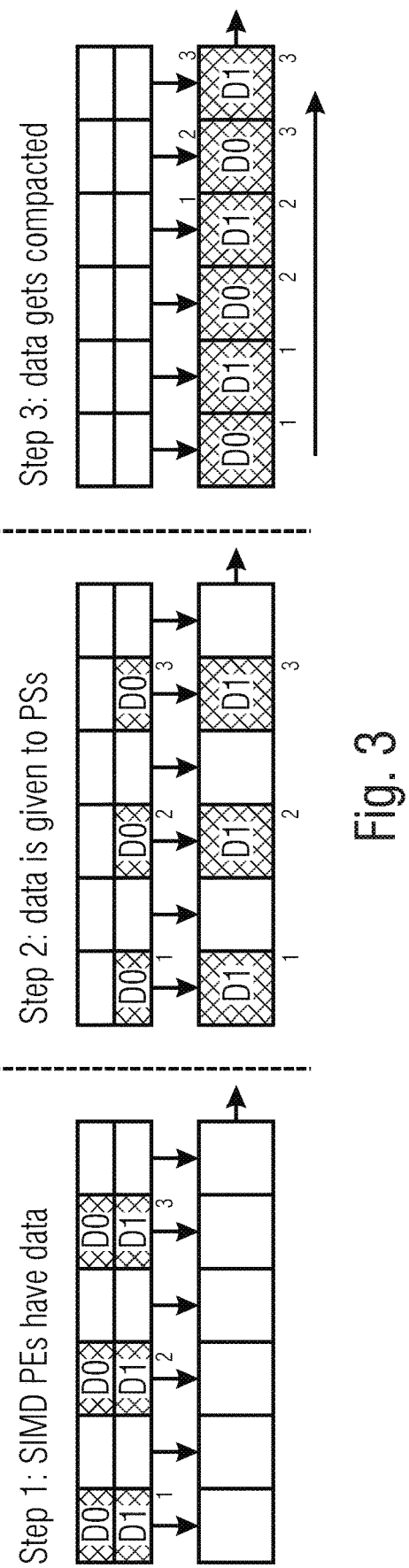
FIG. 3 illustrates schematically a readout procedure with sparse data of double word length according to an embodiment.

FIG. 3 exemplarily illustrates the compaction of words of twice the pipeline bit width. In the first step, the PEs each provide two data elements. In the second step, the data is transferred to the PS2s. Finally, in the third step, the contiguous data packets are compacted.

The proposed pipeline structure can be implemented both synchronously and asynchronously. However, especially for compaction as well as for readout mode 3, an asynchronous implementation is suitable for several reasons:

There is no need for a global high speed clock signal (~1 GHz). Routing such a signal with low skew entails large buffer trees and considerable power consumption.

In contrast to a synchronous implementation, the energy requirement is lower in the average case, since it is data-dependent (inherent clock gating).

Current consumption is distributed continuously over time because there is no global clock signal.

The last two points are especially important for very large pipeline lengths N, as they occur in a VSoC.

III. Hardware Implementation

A. Linear Pipeline

Figure 4A:
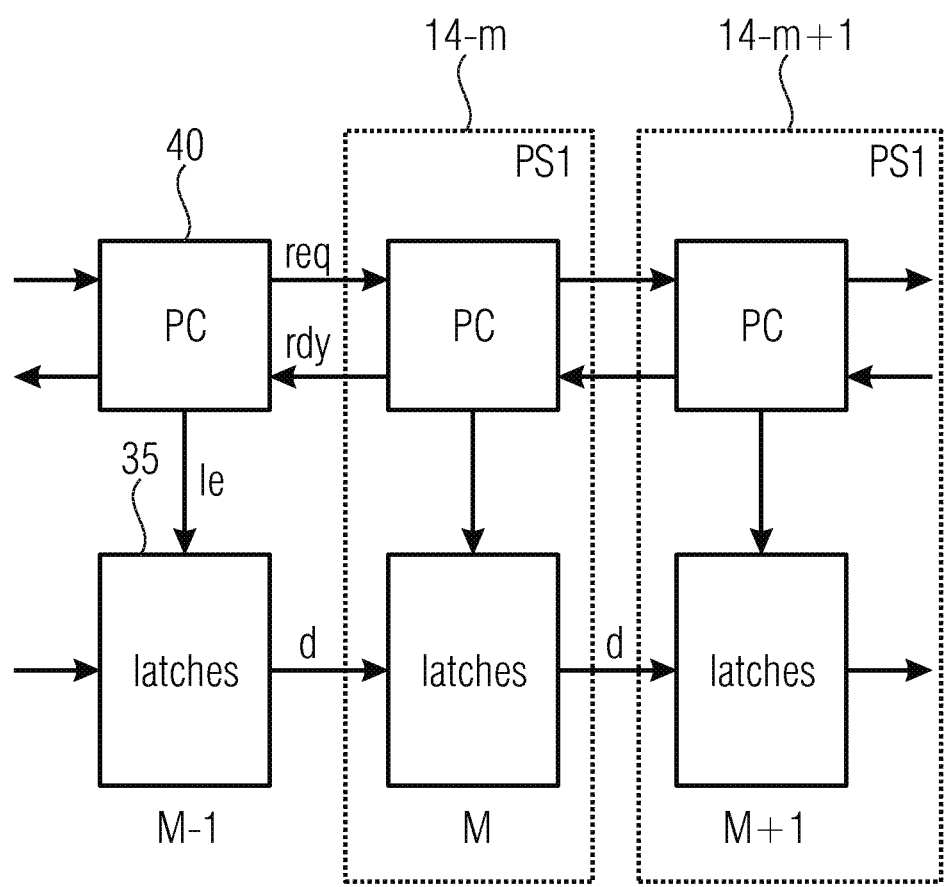
FIGS. 4a and 4b show a schematic block diagram of a linear pipeline and the corresponding pipeline controller, respectively, according to an embodiment.
Figure 4B:
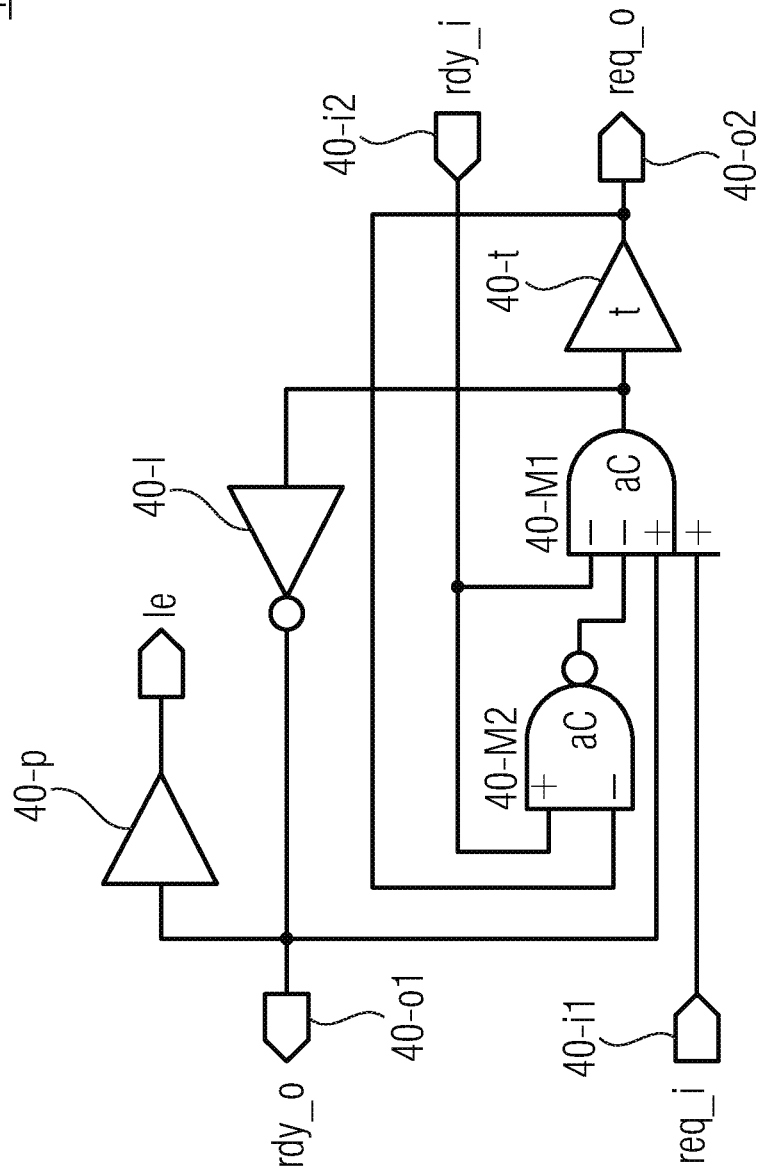

With respect to FIGS. 4a and 4b the implementation of the buffer elements 14-M, 14-M+1, 14-M−1 (corresponding to 14-1, 14-2 and 14-M in FIG. 1) will be discussed. The discussion of FIGS. 4a and 4b is made on the assumption that each buffer element 14-1 to 14-M comprises a buffer controller 40 and a corresponding latch 35 controlled by the buffer controller 40 (c.f. signal Ie). The latches 35 of the M (M−1 and M+1) stages are connected to each other in order to receive data bit sequences from the previous latch 35-M−1(c.f. signal D). The buffer controller 40 of the M stages (M−1 and M+1) are connected to each other via two signal paths, one enabling a process controller 40 to indicate that it is ready to receive further data (c.f. signal rdy) from the previous controller and one for indicating the subsequent controller that it is used to forward data (c.f. signal req). Bellow, the functionality of the basic structure of an asynchronous pipeline stage consists of a pipeline controller (PC) and an associated data path will be discussed.

A pipelined structure is formed by concatenation of several stages. For example, a three-stage pipeline is shown in FIG. 4a. Data transported through the pipeline is held in latches, which are controlled by the respective PC.

Asynchronous pipelines stand out due to the fact that there may be no global synchronization by means of a clock signal, but local synchronization via handshaking signals between successive pipeline stages. Generation and processing of the handshaking signals is carried out by the PC. A lot of implementations are proposed in the literature, with Nowick and Singh [7] giving a good overview. The differences are essentially the choice of the handshaking protocol, the requirement of timing constraints, the choice of data encoding and the logic style used. The pipeline proposed in this paper is to be based on the so-called single rail bundled data concept, due to lower wiring and logic complexity for the data path compared to dual rail encoding. In the context of the readout path, fast compaction of sparse data is to be made possible, necessitating low forward latency of the pipeline controller. Here, forward latency means the time needed to propagate data from one stage to the next one. Furthermore, the storage time within the pipeline is not known in advance, which is why dynamic logic is not applicable. The High Capacity (HC) pipeline, an implementation with very low forward latency, but based on dynamic logic, was presented by Singh and Nowick [9]. The controller 40 used for the latch 35 is designed for static latches. Its function is first explained using a linear controller, before expanding it to a pipeline controller with two inputs.

The PC buffer controller 40 used for the operation of linear pipelines 14-m is illustrated by FIG. 4b. The buffer controller 40 comprises three gates, the two asymmetrical C-elements 40-M1 and 40-M2, as well as an inverter 40-I. A C-element [8] is a common gate in asynchronous circuits, e.g. for state encoding, similar to a flip-flop in synchronous implementations.

Additionally, the controller 40 comprises two outputs 40-02 for outputting the req signal to the subsequent buffer element/controller of the subsequent buffer element and 40-01 for outputting the rdy signal to the controller of the previous buffer element. As input, the controller 40 comprises the input 40-i2 and 40-i1. 40-i2 is used for receiving the ready signal rdy from the subsequent buffer controller and the input 40-i2 for receiving the req signal from the controller of the previous buffer element.

The C-element 40-M1 comprises, for example, two minus inputs, wherein one minus input is coupled to the input 40-i2 such that 40-M1 can use the rdy_i signal. The second minus input is coupled to the C-element 40-M2, namely to the inverted output of same. Additionally, the C-element 40-M1 comprises two plus inputs, wherein one is coupled to the input 40-i1 to receive the req_i and the other to the output of the C-element 40-M1 via the inverter 40-i.

The second C-element 40-M2 comprises, for example, a plus input coupled to the input 40-i2 for receiving the rdy_i signal at a neutral input for receiving the req_o signal output via the output 40-02. Here it should be noted that the req_o signal is the signal output by the C-element 40-M1, but delayed by the element 40-t. The output 40-01 is coupled to the output of the C-element 40-M1 via the inverter 40-1, so the rdy_o signal is the inverted version of the signal output by the C-element 40-M1.

Additionally, the controller 40 comprises another output for outputting the Ie signal which controls the latch (not shown). The Ie signal substantially complies with the rdy_o signal, but is processed by the additional process element 40-p, e.g., an amplifier. Below, the functionality of the controller 40 will be discussed.

The output of the C-element is 1, if all positive inputs and neutral inputs are in state 1 and it is 0, if all negative inputs and neutral inputs are in state 0. In all other cases, the output remains unchanged.

The request signal req_i (FIG. 4b) indicates the arrival of new data, with state 1 meaning new data from the previous pipeline stage has arrived, whereas state 0 indicates that no new data is available. The signal req_i of stage n may not change into state 1, until all the data of the m−1-th stage are stable at the latches of the m-th stage. This condition is, in the case of a pipeline without combinatorial logic in the data path, i.e. in case of a FIFO, usually fulfilled by default, while in the case of pipelines with higher data path delays, it is achieved by introducing an additional delay element r into the request signal. The request signal req_o signals the presence of new data to the m+1-th stage. It is set when the m-th stage has absorbed new data, i.e. if req_i has been set before and rdy_o is in state 1. The signal is generated by the C-element M1. The request of the m-th stage remains, until it is acknowledged by the m+1-th stage with a falling edge of rdy_i. The C-element M2 ensures that the rdy_i signal was in state 1 between two transfers, i.e. that indeed the falling edge is evaluated. After being acknowledged, the request signal req_o changes again to state 0 and the m-th stage becomes ready for a new transfer. For the pipeline controller to operate correctly, several—fortunately easily satisfiable—timing constraints have to be met. The first constraint (Equation 1) is there to ensure that the data path is faster than the control path.

$$t_{M1}+t_{delay}>t_{DQLatch} \quad (1)$$

The second constraint (Equation 2) defines a minimum pulse length at the gate input of the latches, which ensures correct sampling of the latches.

$$t_{M1}+t_{inv} \geq t_{GLatch} \quad (2)$$

The third and final constraint (Equation 3) is there to ensure that C-element M2 may have recognized that rdy_i had been in state 1 before it returned to state 0.

$$t_{M1}+t_{inv}>t_{M2\downarrow} \quad (3)$$

Figure 5A:
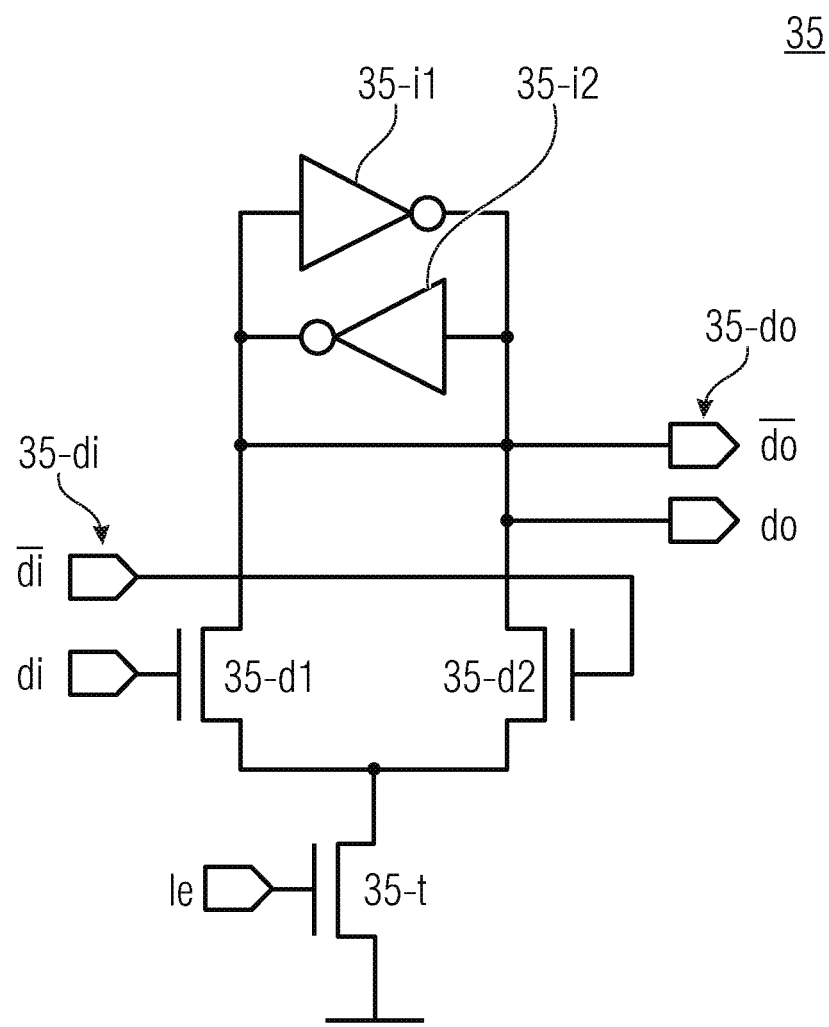
FIGS. 5a and 5b show schematically latch implementations for the data path according to an embodiment.

Equation 1 specifies that the delay time of the latches needs to be shorter than the one of the control path. Since the control path only has a delay equivalent to one C-element, this condition cannot be realized with conventional $C^2MOS$ latches. Furthermore, in order to avoid additional multiplexers, latch implementations that are easily expandable by a second input, should advantageously be used. FIG. 5a shows such a latch implementation 35 with one data and select input. The latch 35 comprises a differential pair 35-d1 and 35-d2 as well as two feedback inverters 35-i1 and 35-i2.

The differential pair 35-d1 and 35-d2 comprises two transistors 35-d1 and 35-d1. The drain contacts of the transistor 35-d1 and 35-d1 are coupled to each other via the two inverters 35-i1 and 35-i2 which are arranged in parallel but contrarily orientated. The two inverters have the purpose to enable a stable state of the differential pair 35-d1/35-d2 as long as no external input is received. The two transistors 35-d1 and 35-d2 are coupled to the data input 35-di (differential input) via its gates. The source electrodes of the differential transistors 35-d1 and 35-d2 are coupled to another transistor 35-t which is configured to be controlled by the control signal Ie. Based on the control signal Ie and by use of the transistor 35-t, the differential pair 35-d1/35-d2 is controlled, such that same can receive new data from the input 35-di. The data stored by the differential pair 35-d1/35-d2 can be output via the output 35-do (differential output) which is coupled to the drain contacts of the two transistors 35-d1 and 35-d2. It should be noted that the delay time of the latches 35 corresponds to that of an inverter and is, if sized appropriately, faster than a C-element delay time of at least two inverter stages.

B. Multi Input Pipeline

Figure 6:
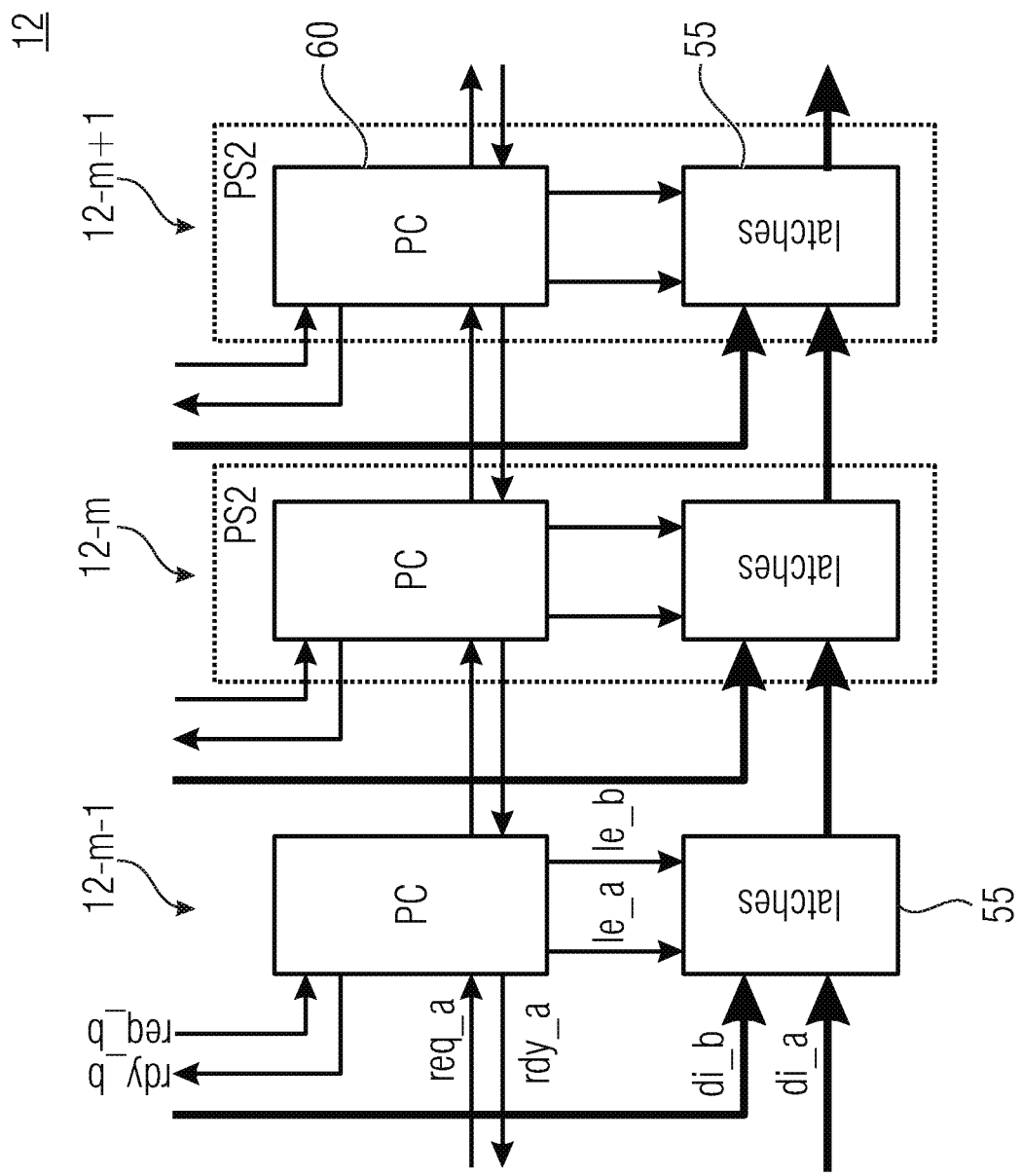
FIG. 6 shows a schematic block diagram of a multi input pipeline according to an embodiment.

Starting from the linear pipeline controller, as it is used inside the PEs to provide contiguous packets, it is now expanded by arbitration. The structure of the resulting pipeline is shown in FIG. 6 showing 3 pipeline stages 12-m−1, 12-m and 12-m+1. The linear pipeline 12 (c.f. FIG. 1) is shown in detail by FIG. 6. FIG. 6 shows three pipeline stage elements, wherein each pipeline stage element comprises a process controller 60 and a latch 55 controlled by the process controller 60 via the control signals Ie_a and Ie_b. The process controller 60 of the different stages is coupled to each other in order to exchange the signal req_a and rdy_a indicating the requirements or readiness for receiving or uploading data. Additionally, the process controller 60 is connected to the controllers of the linear pipelines (not shown) to exchange the signals rdy_b and req_b for indicating the readiness or requirements to read-out data from the last buffer element.

The latch 55 comprises two inputs, one coupled to the latch of the previous pipeline element and one coupled to the latch of the last buffer element. These signal paths are marked by their reference numerals di_b (from the buffer element) and di_a (from the previous pipeline element). In other words, the pipeline 12 may be described as one having N+1 inputs and one output for the N stages, wherein the inputs are selected using an arbiter (not shown) belonging to the controller 60. The arbiter has the purpose to select either input a (di_a) or input b (di_b), depending on which of the two inputs provides new data.

The channel selection remains, until no successive data is available for a given duration, i.e. a continuous transfer was interrupted. This makes it possible to implement contiguous packets without having to evaluate special control information within the data words. Below, the latch 55 will be discussed with respect to FIG. 5b, before discussing the arbiter with respect to FIG. 7 and the controller 60 with respect to FIG. 8.

The latch 55 substantially complies to the latch 35, wherein the latch 55 has two differential pairs, i.e., the differential pairs 35-d1/35-d2 and 55-d1 and 55-d2 which are arranged parallel and both coupled to the two inverters 35-i1 and 35-i2 via the respective drain contacts of the differential pairs 35-d1/35-d2 and 55-d1/55-d2 are coupled to their own control transistor 35-t and 55-t via its drain contacts, wherein the two transistors receive control signals Ie_a and Ie_b from the controller. Via the control signals, the respective differential pair 35-d1/35-d2 or 55-d1/55-d2 can be selected to read-out data from the respective inputs 35-di or 55-di belonging to the differential pairs 35-d1/35-d2 or 55-d1/55-d2. Both differential pairs are coupled to a common output 35-do via the drain contacts.

Figure 7:
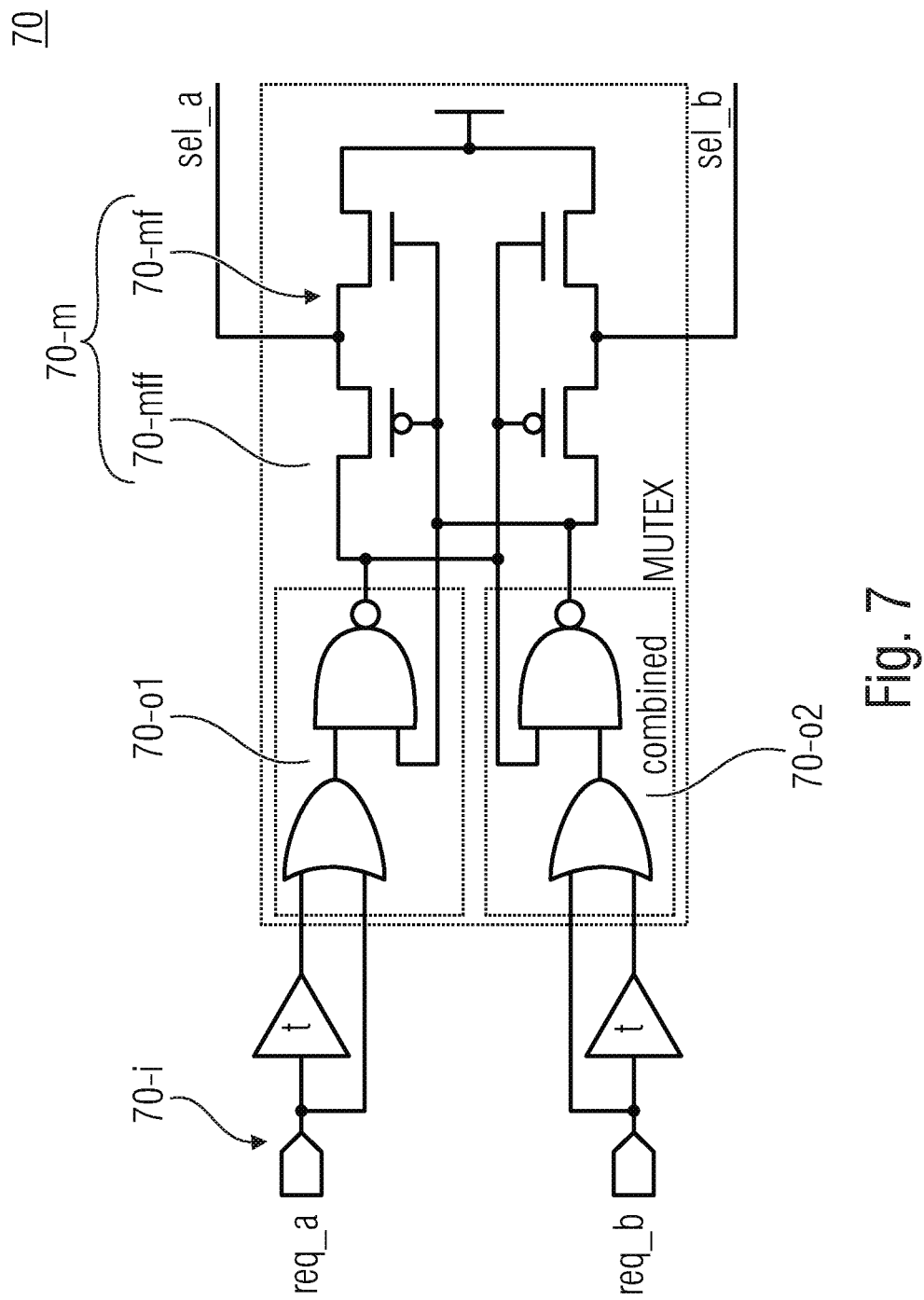
FIG. 7 shows a schematic block diagram of an arbiter for channel selection with channel hold function according to an embodiment.

FIG. 7 shows an arbiter 70 comprising an element enforcing mutual exclusion 70-m (MUTEX), which, in case of competing requests, selects one of the two channels A or B in a glitch-free manner. The MUTEX consists of a NAND RS flip-flop 70-*mff* followed by a metastability filter 70-*mf* a well-established implementation, that is also frequently used by other authors [6], [11]. The additional OR gates 70-*o*1 and 70-*o*2 at the input hold the actual channel selection for a certain time. The induced slowdown is insignificant, since the NAND and OR gate can be combined into a single-stage CMOS gate. The hold time is set using delay elements and should be chosen somewhat larger than the cycle time of a pipeline stage. If the selected delay elements do not propagate rising edges considerably faster than falling ones, incoming request signals may be too short to be visible at the output of the delay element. This can be accomplished using a chain of inverters or, alternatively, by designing a special gate which exhibits this behavior. As long as no active channel has been selected, the delay time of the arbiter has a direct effect on the forward latency of the pipeline controller. However, this cannot be avoided due to unknown temporal relations between the incoming request signals.

Figure 5B:
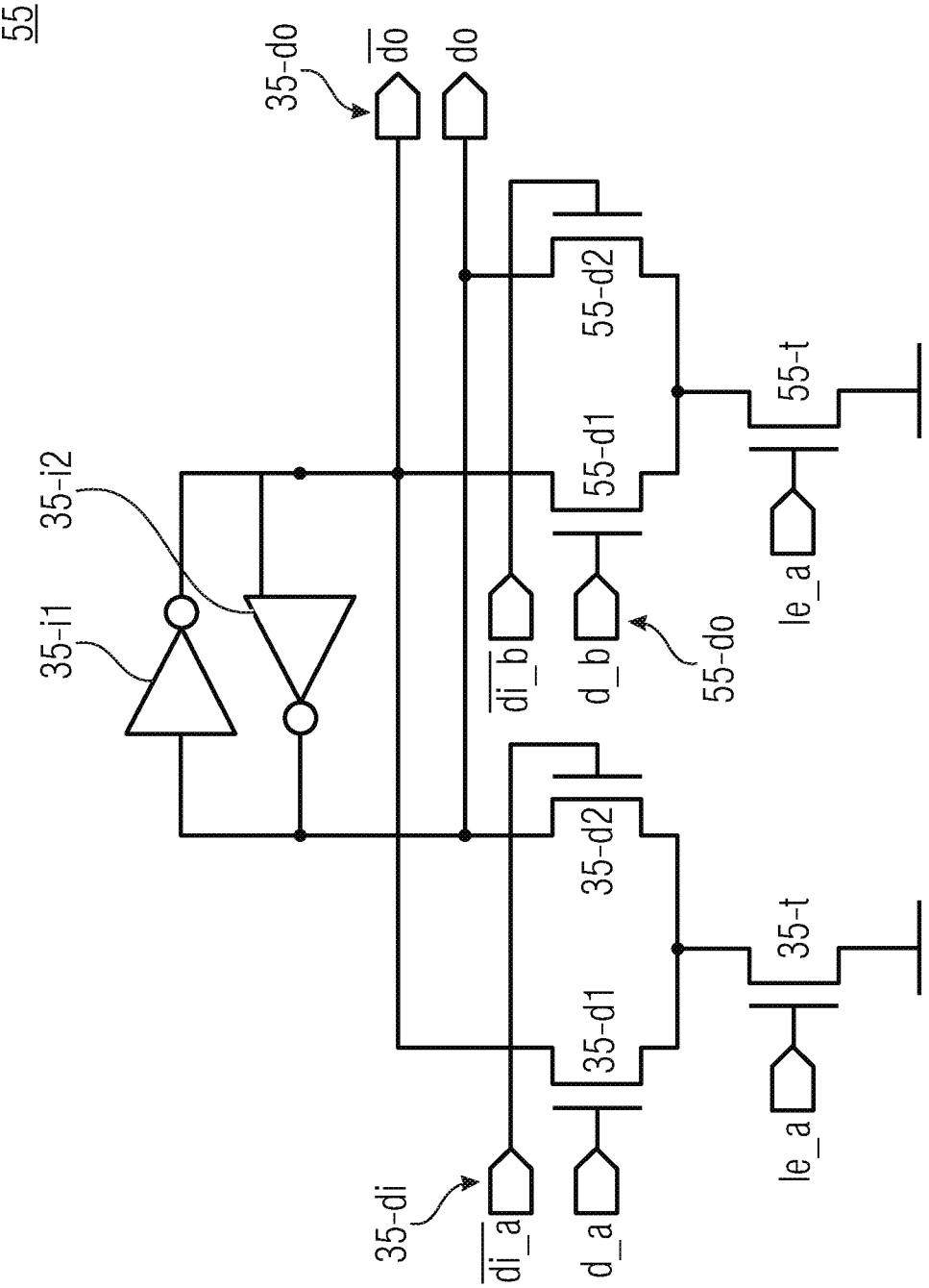
Figure 8:
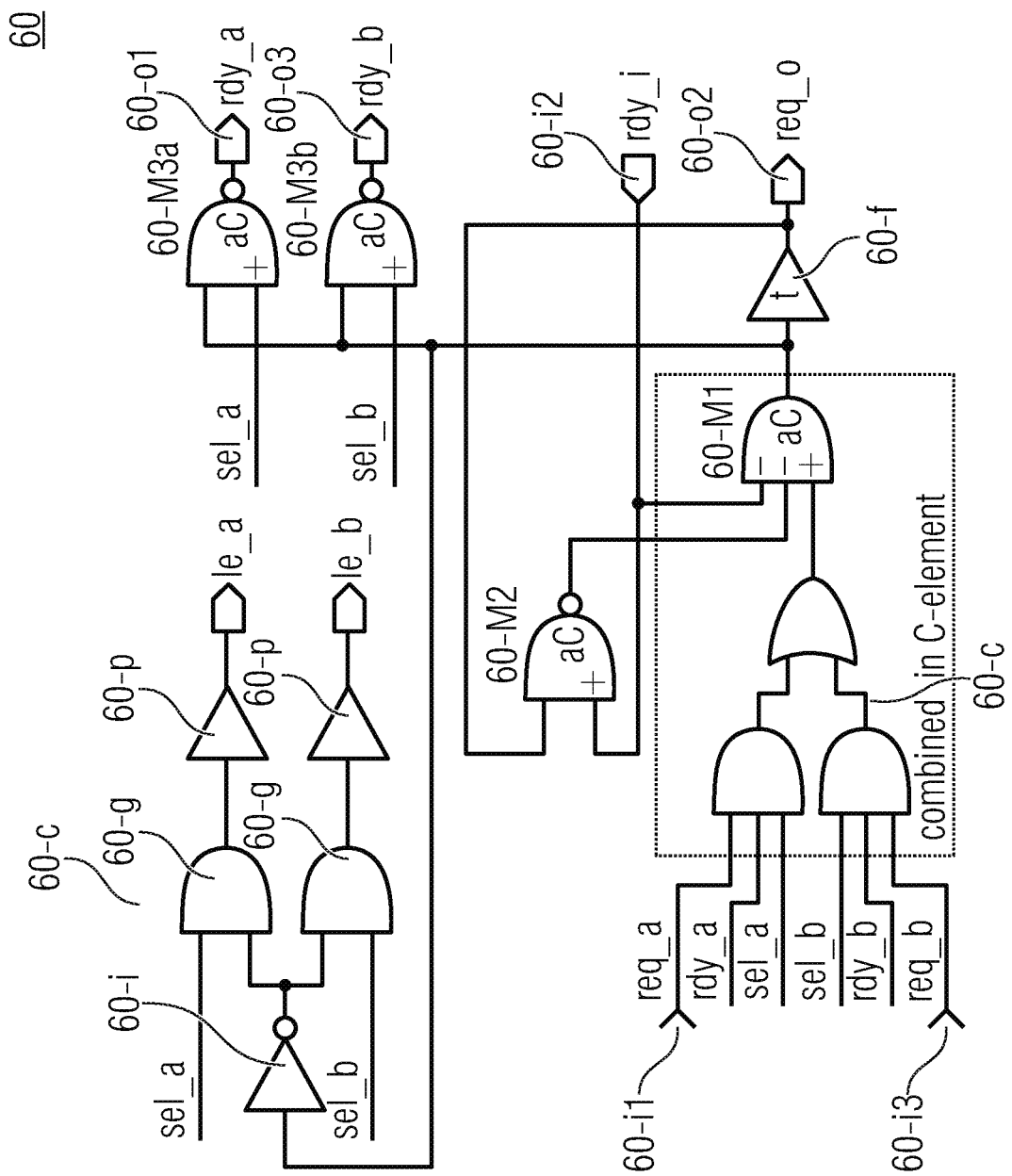
FIG. 8 shows a schematic of the two-input pipeline controller according to an embodiment.

FIG. 8 depicts the pipeline controller 60 with two inputs. The pipeline controller 60 comprises two C-elements 60-M1 and 60-M2 as well as two additional elements 60-M3*a* and 60-M3*b*. The controller 60 comprises three inputs and three outputs for communicating with the controllers adjacent to the controller 60. In detail, the controller 60 comprises a first input 60-*i*1 for receiving a signal req_a from a previous pipeline stage element indicating a data bit sequence to be forwarded, a second input 60-*i*2 for receiving a signal rdy_i from a subsequent pipeline stage element indicating the ability to receive a data bit sequence and a third input 60-*i*3 to receive a signal req_b from the last buffer element indicating a data bit sequence to be read-out. The controller 60 comprises a first output 60-*o*1 outputting a signal rdy_an indicating the ability to receive a data bit sequence to be forwarded from a previous pipeline stage element, a second output 60-*o*2 outputting a signal req_o indicating the demand to forward a data bit sequence to the subsequent pipeline stage element and a third output 60-*o*3 outputting a signal rdy_b indicating the ability to read-out a data bit sequence from the last buffer element. Additionally, the controller 60 comprises to control outputs outputting the signal Ie_a and Ie_b to the corresponding latch (c.f. FIG. 5*b*).

Therefore C-element 60-M1 comprises, for example, two minus inputs and one plus input. The minus input is coupled to the second input 60-*i*2, wherein the minus input is coupled to the inverted output of the C-element 60-M2. The plus input is coupled using a combining element 60-C with the input 60-*i*1 and the output 60-*o*1 as well as both the input 60-*i*3 and the output 60-*o*3. Additionally, the combining element 60-*c* has input for the arbiter outputs outputting the signal sel_a and sel_b.

The second C-element 60-M2 comprises, for example, a plus input for receiving the signal rdy_i of the input 60-*i*2 at a neutral input for receiving the second req_o of the output 60-*o*2. It should be noted that the signal req_o complies with the signal output by the second C-element 60-M1, when delayed by the delay element 60-*t*.

The C-elements 60-M3*a* and 60-M3*b* have a plus input for receiving the signal sel_a of the arbiter or sel_b of the arbiter. Additionally, both have a neutral input coupled to the output of the C-element 60-M1. Both elements 60-M3*a* and 60-M3*b* have an inverted output outputting the signal rdy_a and rdy_b.

Due to the two elements 60-M3*a* and 60-M3*b*, the ready signal can be output by the element 60-M1, wherein a selection between rdy_a and rdy_b can be taken using the arbiter signal. In other words, this means that the rdy_a or rdy_b signal is output dependent on the selection of the arbiter. The same signal is used to control the latch using the entity 60-*l*. The entity 60-*l* may comprise an inverter 60-*i* to gates 60-*g* receiving a sel_a or sel_b signal from the arbiter, such that dependent on the sel_a or the sel_b signals the Ie_a or Ie_b signal may be output using two process elements 60-*p* for the respective control output. The signal Ie_a or Ie_b is an inverted version (inverted by 60-*i*) of the signal output by the element 60-M1 and forwarded to the respective control output dependent on the selection of the arbiter.

Below, the logic of the controller 60 will be discussed in detail.

The outgoing request signal req_o is once again generated by the C-element 60-M1. The additional logic at 60-M1's positive input makes sure that the outgoing request is only set, if the condition $(req_a \wedge sel_a \wedge rdy_a) \vee (req_b \wedge sel_b \wedge rdy_b)$ is fulfilled. This means that a request from channel A is accepted only if the arbiter has selected channel A and the latches in the data path sample data from channel A. The same conditions hold for channel B, in a similar fashion. As this constraint may easily be integrated into NMOS paths of the C-element, there are in fact no additional gates needed, as suggested by the principle circuit in FIG. 8. After setting the signal req_o in the n-th stage, as in the case of the linear controller, the signal rdy_i is set to 0 by the n+1-th stage. Following that, the signal req_o in the n-th stage is reset as well. The latch enable signals Ie_a or Ie_b are logically linked by an "and" function with the signals sel_a or sel_b, respectively.

The signals rdy_a and rdy_b are generated in a similar manner. The channel select signals sel_a or sel_b once again decide whether rdy_a or rdy_b is to be set. C-elements are used at this point, because the ready signals may not change their state during channel switch. Otherwise, the previous pipeline stage may be in an invalid state.

For the controller to operate correctly, timing constraints have to be taken into account, as well. The constraints given in Equations 1 to 3 for linear controllers apply to multi input pipeline controllers in a similar fashion, with the term $t_{M1}+t_{inv}$ now being replaced by $t_{M1}$. This is explained by the fact that, for the linear controller, all latches are transparent if the pipeline stage does not hold valid data. However, in the case of the extended pipeline controller, the latches are not transparent because the channel to be used is not selected yet. This is why the constraints given in Equations 2 and 3 are somewhat more difficult to meet. No further timing constraints are needed.

C. Initialization

So far, two pipeline controllers and the corresponding data path latches have been presented. The very important aspect of initializing the pipeline, however, has not been covered at all. Similar to synchronous circuits, a reset signal is used for this purpose. This signal, which resets all C-elements at once, may be realized by expanding each C-element by just a single transistor. Controlling data transfer from the PEs' data buffers to the output path is another important aspect. This necessitates an additional AND gate controlled by a global start signal to be added to the request signals between PEs and PS2*s*. Otherwise, data elements from the PEs would be immediately fed into the readout pipeline. In this way, it would not be possible readout the pipeline and build up new data in the PEs' data buffers at the same time. In case of very long pipelines, this signal is fed either via a buffer tree or in the opposite direction to the pipeline data flow. This is comparable to the supply of a clock signal with very long shift registers.

IV. Test Results and Comparison

Figure 9:
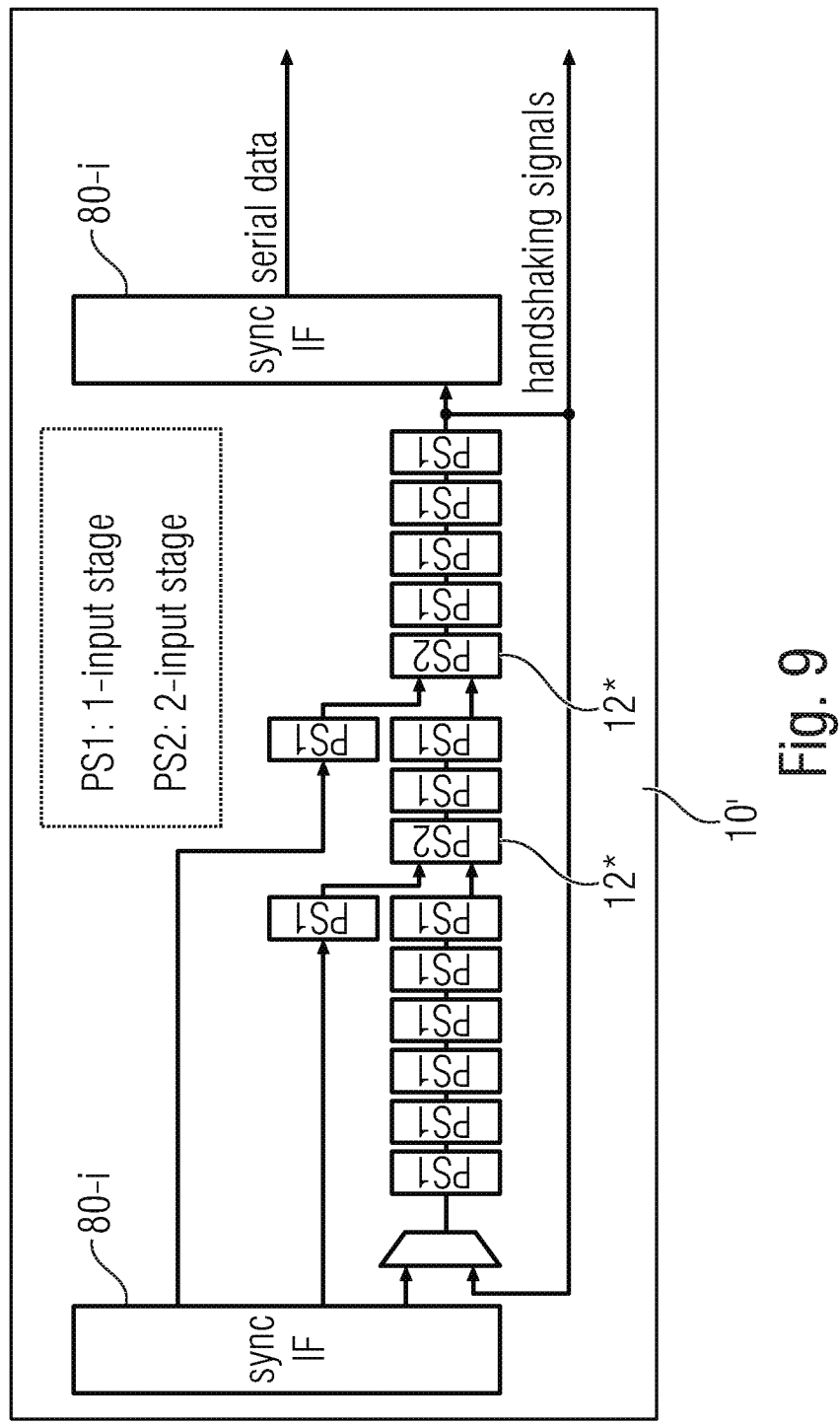
FIG. 9 shows a schematic structure of the measurement test chip of an embodiment.

The developed circuit components were measured on a test chip in a 180 nm CMOS technology and then compared with implementations of asynchronous pipelines known from literature. The presented pipeline controllers were demonstrated to operate correctly using a test chip in a 180 nm low-power CMOS technology. The test chip is illustrated by FIG. 9 showing the inputs via which the synchronization signal is applied to the data bus. The test chip includes a 14-stage asynchronous pipeline 10' with an 8-bit data path. The inputs and outputs can be read or written via synchronous interfaces 80-i. Two of the 14 pipeline controllers (cf. 12*) have been replaced by controllers with arbitration, i.e. the pipeline has a total of three inputs. The two additional inputs are equipped with one buffer stage each. Furthermore, the pipeline can be connected as a ring structure, in order to rotate a defined number of data elements. Handshaking was monitored by using strong buffers to output selected request and ready signals to bond pads. A schematic representation of the structure is given in FIG. 9. In total, there are four test modes available:

In test mode 1, all pipeline elements are filled in a defined order and these are subsequently read out. Arbitration and correctness of the readout data can be checked.

In test mode 2, data is written only to the additional pipeline inputs. This makes it possible to check whether the compaction delivers correct data at the output. In test modes 3 and 4, the pipeline is connected as a ring, i.e. all items that were once inserted, keep circulating within the pipeline. In this mode, the pipeline controllers' forward latency as well as cycle time can be measured. The forward latency is determined by inserting exactly one element. In the case of 14 pipeline elements and assuming that all of them are approximately equal in speed, the forward latency results from the rotation time of the data item according to Equation 4.

$$t_{Forward} \approx t_{Ring1}/14 \quad (4)$$

$$t_{Cycle} \approx t_{Ring13}/14 \quad (5)$$

Figure 10:
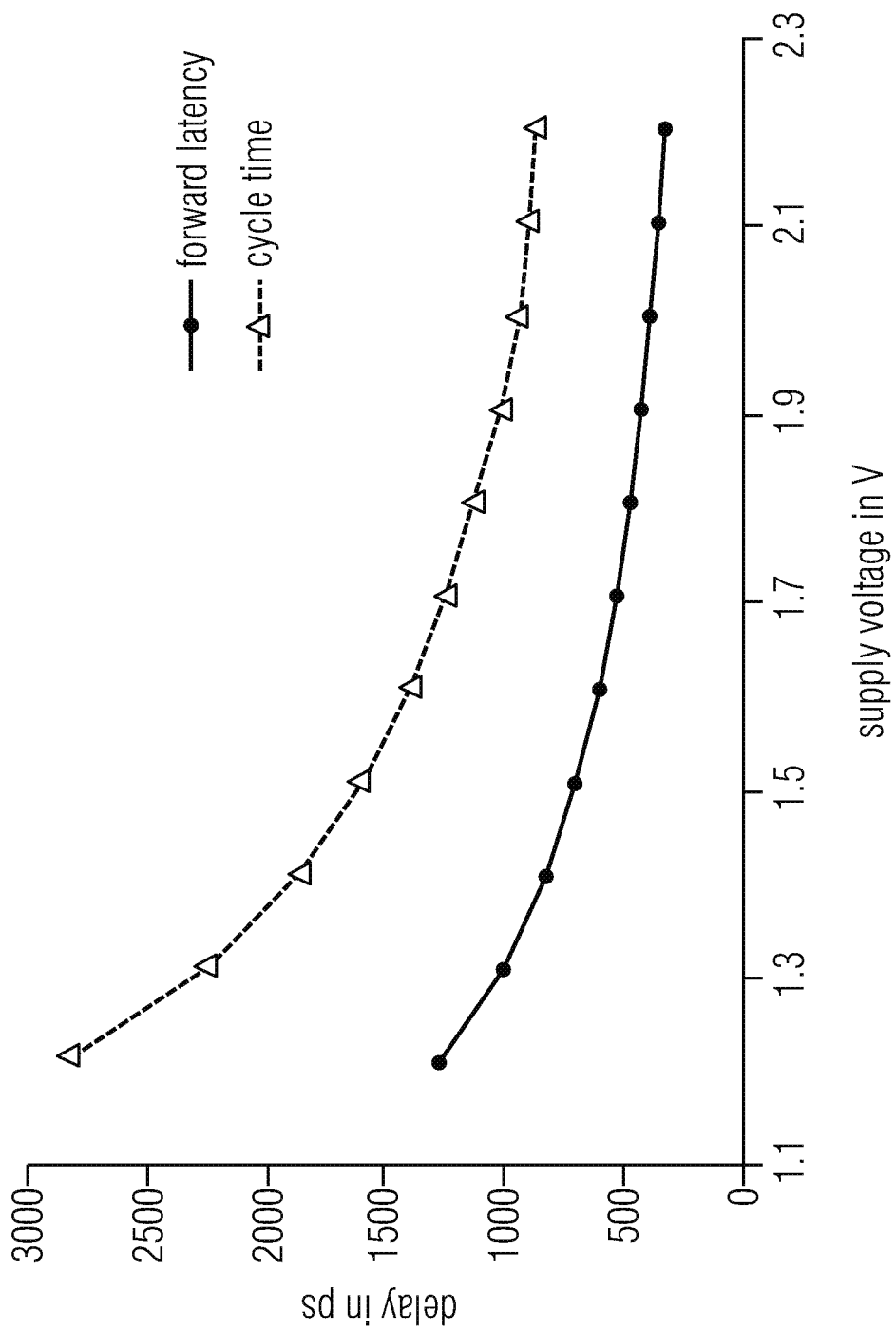
FIG. 10 shows a diagram of measured forward latency and cycle time as a function of supply voltage.
Figure 11:
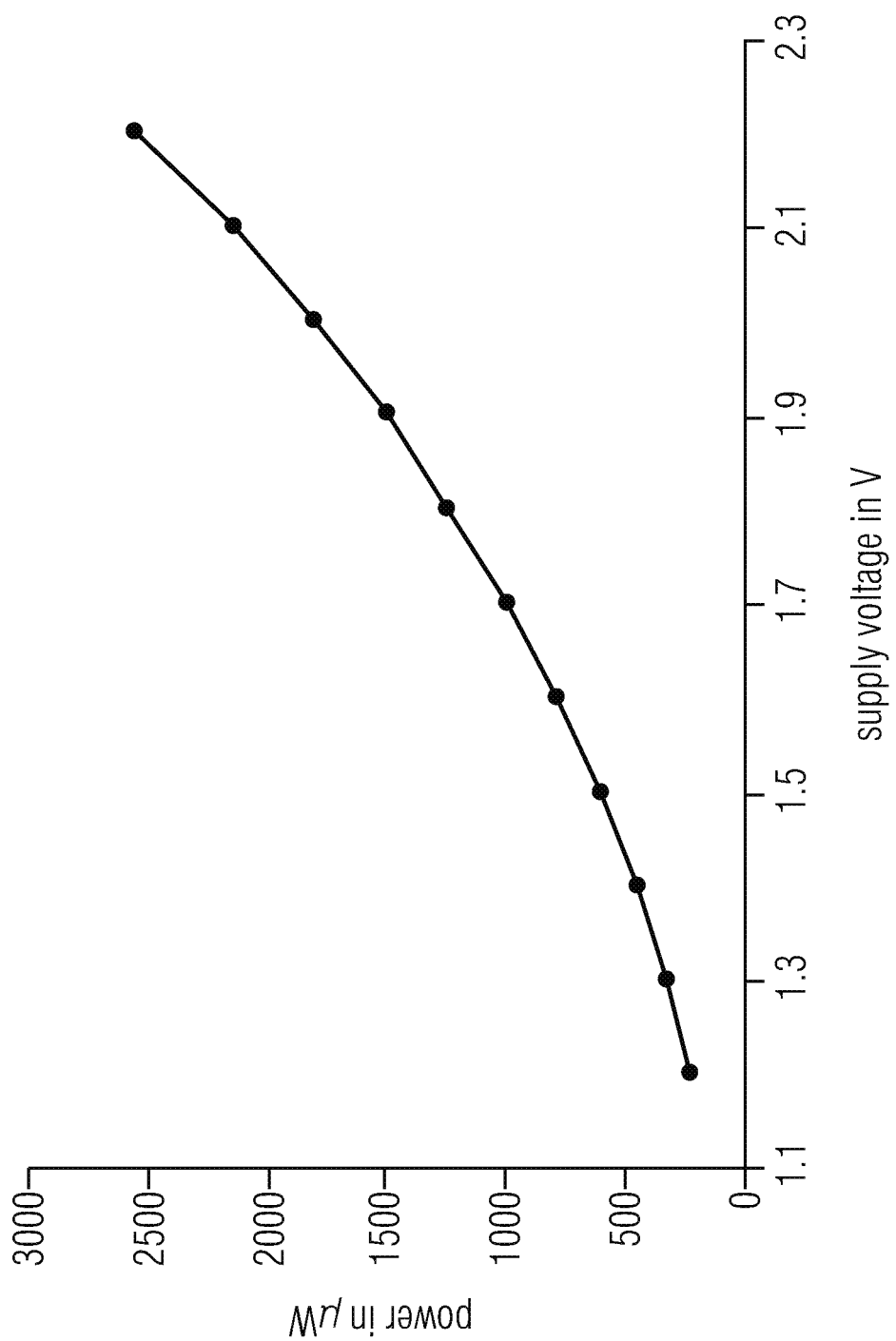
FIG. 11 shows a diagram of measured power consumption as a function of supply voltage.

Similarly, the cycle time of the pipeline controllers can be determined by inserting 13 elements into the pipeline. Then, there is exactly one pipeline stage without a valid data item. In FIG. 10, the measured forward latency as well as the cycle time depending on the supply voltage are shown. As expected, the controllers' speed increases with higher supply voltage. Even at a supply voltage of only 0.7 volts, some of the test chips are still functional. Also, the power consumption was measured for the case that only one element circulates in the ring, see FIG. 11.

Table I shows the delay of the presented pipeline controllers compared to variants in the literature. Compared to the HC pipeline, the implementation presented here is only about half as fast, which is, on the one hand, due to the use of static logic in the data path, on the other hand due to different process technologies. Furthermore, the values given in the literature only apply to linear pipelines. Because of the delay induced by the arbiter, the multi-input pipeline presented is inevitably a little slower. The measured forward latency at a nominal operating voltage of 1.8 V is 520 ps. This corresponds to an equivalent clock frequency of 2 GHz for a synchronous implementation, which is not feasible with currently used technology. Under the same test conditions, a cycle time of 1.1 ns was measured. This corresponds to the throughput of the pipeline when all stages hold a data element.

V. Summary

This work presents a readout path for a Vision System on Chip, which is capable of serially outputting parallel data of a column-parallel SIMD unit. The readout path is implemented as an asynchronous pipeline and therefore enables both very fast compaction of sparse data and readout of continuous data streams. Through clever arbitration, it is possible to transmit contiguous data packets, and thus variable word widths, without additional control information. The circuit components presented were successfully tested on a test chip in a 180 nm CMOS technology. The test chip is illustrated by FIG. 9 showing the inputs via which the synchronization signal is applied to the data bus. With 520 ps measured forward latency at nominal operating voltage, the proposed asynchronous pipeline has been found to equal a corresponding synchronous implementation clocked at 2 GHz.

VI. Additional Embodiments

According to another embodiment, the data bus according to FIG. 1 forms a matrix-shaped data source having the process elements PE. According to embodiments, continuously arranged data bits (data portions belonging together) can be output as continuous data stream. Here, each pipeline element controls the data flow, such that the content of a column (linear pipeline) is read-out and forwarded over the main pipeline. Alternatively, all columns may be read-out, such that the pipeline buffers as much data as can be forwarded. This may result in a non-continuous data stream, as illustrated with respect to FIG. 2. According to another embodiment, the read-out procedure may be dependent on the available resources, such that a plurality of data bit sequences (belonging to a common data packet) may be read-out together. This note is especially suitable, when not all columns deliver data, as illustrated by FIG. 3.

According to another embodiment, each pipeline stage element may comprise a random which serves the purpose to switch between the inputs of the pipeline stage element, so that all columns can be read-out without any priorities. This principle can also be used for the plurality of data bit sequences belonging together, i.e., when the switching between the inputs is performed after the read-out of two or more sequences.

The above discussed controllers may, according to embodiments, be configured to determine data portions belonging together, such that same can be handled as data packet. According to another embodiment, the controller may comprise an input, via which a prioritization of a data flow, e.g., of a column can be initiated.

Also, within above embodiments, the operation mode has been discussed as asynchronous operation mode, it should be noted, that also a synchronous operation mode is suitable.

Although within above embodiments, the pipeline has been discussed in context of a latch used as buffer, it should be noted, that also other buffer elements or memory cells can be used for the buffer elements and for the pipeline stage elements. Advantageously, a latch having a multiplexer is used, wherein the latch used within a pipeline stage element typically comprises two inputs, but may also comprise more inputs (N inputs). In this case, the latch typically comprises N differential pairs. Another embodiment refers to a multi-input arbiter having two or N inputs belonging to the pipeline controller. The arbiter may also be enhanced to N inputs. In this embodiment, not only the buffer stage element is enhanced to N inputs, but also the controller of same. A typical application of a pipeline having N inputs is a so-called multi-chip-implementation having a 3D integration of a chip including chip stacking.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A data bus comprising:
   process elements, each process element coupled to a linear pipeline comprising M stages arranged in series, each of the M stages comprising a plurality of buffer elements configured to buffer a data bit sequence and to forward the buffered data bit sequence from a first buffer element of the plurality of buffer elements to a last buffer element of the plurality of buffer elements; and
   a linear main pipeline comprising N pipeline stage elements arranged in series,
   wherein each pipeline stage element is connected to the last buffer element of a respective linear pipeline and configured to read out one or more of the buffered data bit sequences and to forward the read-out data bit sequences from one of N pipeline stage elements to a next of the N pipeline stage elements;
   wherein each pipeline stage element is configured to perform the reading-out sequentially; and wherein each pipeline stage element is configured to read-out all buffered data bit sequences from the last buffer element of a respective linear pipeline before forwarding another data bit sequence from a previous of the N pipeline stage elements such that a continuous data stream is generated by the linear main pipeline forwarding the read-out data bit sequences; and/or wherein each pipeline stage element is configured to forward all data bit sequences from the previous of the N pipeline stage elements before reading-out another data bit sequence from the last buffer element of a respective linear pipeline such that a continuous data stream is generated by the linear main pipeline forwarding the read-out data bit sequences.

2. The data bus according to claim 1, wherein the N pipeline stage elements are asynchronous pipeline elements; and/or wherein two subsequent pipeline stage elements are configured to perform a handshake procedure in order to initiate a forward of a data bit sequence and/or in order to indicate an ability to receive a data bit sequence to be forwarded from a previous pipeline stage element.

3. The data bus according to claim 1, wherein each pipeline stage element comprises a first data input for receiving a data bit sequence from a previous pipeline stage element and a second data input for receiving a data bit sequence from the last buffer element of a respective linear pipeline.

4. The data bus according to claim 3, wherein each pipeline stage element comprises a latch controlled by a pipeline controller of each pipeline stage element.

5. The data bus according to claim 4, wherein the latch is a latch comprising a multiplexer.

6. The data bus according to claim 4, wherein each latch comprising a first and a second differential pair of transistors and two feedback inverters coupled to the differential pair of transistors via drain contacts; and/or
wherein data inputs of the last buffer element of a respective linear pipeline are connected to gate contacts of the transistors of the first differential pair, wherein data inputs of a previous pipeline stage element are connected to gate contacts of the transistors of the second differential pair, wherein data outputs are connected to the drain contacts of the first and second differential pairs and wherein a control input is connected to the source contacts of the transistors.

7. The data bus according to claim 1, wherein the pipeline stage elements operate asynchronously.

8. The data bus according to claim 1, wherein each buffer element comprises a latch at least connected to a previous or subsequent latch and/or controlled by a buffer controller.

9. The data bus according to claim 8, wherein each latch comprising a differential pair of transistors and two feedback inverters coupled to the differential pair of transistors via drain contacts; and/or
wherein data inputs are connected to gate contacts of the differential pair of transistors, wherein data outputs are connected to the drain contacts and wherein a control input is connected to source contacts of the differential pair of transistors.

10. The data bus according to claim 9, wherein the buffer controller comprises a first input for receiving a signal from a previous buffer element indicating a data bit sequence to be forwarded, a second input for receiving a signal from a subsequent buffer element indicating an ability to receive a data bit sequence; and/or
wherein the buffer controller comprises first output outputting a signal indicative for the ability to receive a data bit sequence to be forwarded and a second output outputting a signal indicative for a demand to forward a data bit sequence.

11. The data bus according to claim 10, wherein the buffer controller comprises a first asymmetric C-element with two positive and two negative inputs, a second asymmetric C-element with one positive and one neutral input and an inverted output;
wherein the second asymmetric C-element is connected with its neutral input to the second output and with its positive input to the second input; and
wherein the first asymmetric C-element is connected with its negative input to a output of the second asymmetric C-element, with its positive input to the first input and connect with its output to the second output.

12. The data bus according to claim 11, wherein the buffer controller comprises a delay element arranged between an output of the first asymmetric C-element and the second output.

13. The data bus according to claim 11, wherein the buffer controller comprises an inverter element arranged between an output of the first asymmetric C-element and the first output.

14. The data bus according to claim 11, wherein the first asymmetric C-element is connected via an arbiter to the first and third input and wherein the arbiter is configured to select the last buffer element of a respective linear pipeline or a previous pipeline stage element as data source for data to be forwarded.

15. The data bus according to claim 11, wherein each pipeline stage element comprises a latch at least connected to a previous or subsequent latch and/or controlled by a pipeline controller, wherein the pipeline controller is connected to the latch via an entity comprising an input for the arbiter.

16. The data bus according to claim 1, wherein each buffer element comprises a buffer controller.

17. The data bus according to claim 16, wherein two subsequent buffer controllers are connected to each other.

18. The data bus according to claim 16, wherein the buffer controller comprises a first asymmetric C-element and a second asymmetric C-element; and/or
wherein the buffer controller comprises a first asymmetric C-element with two positive and two negative inputs, a second asymmetric C-element with one positive and one neutral input and an inverted output.

19. The data bus according to claim 1, wherein each pipeline stage element comprises a pipeline controller.

20. The data bus according to claim 19, wherein the pipeline controller of each pipeline stage element comprises a first input for receiving a signal from a previous pipeline stage element indicating a data bit sequence to be forwarded, a second input for receiving a signal from a subsequent pipeline stage element indicating an ability to receive a data bit sequence and a third input to receive a signal from the last buffer element indicating a data bit sequence to be read out; and/or
wherein the pipeline controller of each pipeline stage element comprises first output outputting a signal indicative for the ability to receive a data bit sequence to be forwarded and a second output outputting a signal indicative for a demand to forward a data bit sequence; and wherein the pipeline controller of each pipeline stage element comprises third output outputting a signal indicative for the ability to readout a data bit sequence.

21. The data bus according to claim 20, wherein the pipeline controller of each pipeline stage element comprises a first asymmetric C-element and a second asymmetric C-element.

22. The data bus according to claim 21, wherein each pipeline controller of each pipeline stage element comprises a first asymmetric C-element with a positive and two negative inputs, a second asymmetric C-element with one positive, one neutral input and an inverted output;
wherein the second asymmetric C-element is connected with its neutral input to the second output and with its positive input to the second input; and
wherein the first asymmetric C-element is connected with its negative input to an output of the second asymmetric C-element, with its positive input to the first input and the third input and connect with its output to the second output.

23. The data bus according to claim 22, wherein the first asymmetric C-element is connected to the second output via a delay element.

24. The data bus according to claim 21, wherein the pipeline controller of each pipeline stage element comprises a third and fourth asymmetric C-element, each comprising an inverted output and being connected to the respective first and third output.

25. The data bus according to claim 24, wherein the third and fourth asymmetric C-element are connected via an arbiter to the first and third input, and wherein the arbiter is configured to select the last buffer element of a respective linear pipeline or a previous pipeline stage element as data source for data to be forwarded.

26. The data bus according to claim 1, wherein each pipeline stage element comprises a plurality of data inputs.

27. The data bus according to claim 1, wherein each process element generates data.

28. The data bus according to claim 27, wherein each process element is connected to a process element of a Single Instruction Multiple Data (SIMD) unit.

29. A method for controlling a data bus, the data bus comprises process elements, each process element coupled to a linear pipeline comprising M stages arranged in series, each of the M stages comprising a plurality of buffer elements configured to buffer a data bit sequence and to forward the buffered data bit sequence from a first buffer element of the plurality of buffer elements to a last buffer element of the plurality of buffer elements; a linear main pipeline comprising N pipeline stage elements arranged in series, wherein each pipeline stage element is connected to the last buffer element of a respective linear pipeline; the method comprising:

reading-out all buffered data bit sequences or a predefined number of data bit sequences from the last of the buffer element of a respective linear pipeline before forwarding another data bit sequence from a previous of the N pipeline stage elements; and/or forwarding data bit sequences from the previous of the N pipeline stage elements before reading-out another data bit sequence from the last buffer element of a respective linear pipeline;

wherein the reading-out is performed sequentially; and wherein each pipeline stage element reads-out all buffered data bit sequences from the last of the buffer of a respective linear pipeline before forwarding another data bit sequence from the previous of the N pipeline stage elements such that a continuous data stream is generated by the linear main pipeline forwarding the read-out data bit sequences; and/or wherein each pipeline stage element forwards all data bit sequences from the previous of the N pipeline stage elements before reading-out another data bit sequence from the last buffer element of a respective linear pipeline such that a continuous data stream is generated by the linear main pipeline forwarding the read-out data bit sequences.

30. A non-transitory digital storage medium having a computer program stored thereon to perform a method for controlling a data bus, the data bus comprises process elements, each process element coupled to a linear pipeline comprising M stages arranged in series, each of the M stages comprising a plurality of buffer elements configured to buffer a data bit sequence and to forward the buffered data bit sequence from a first buffer element of the plurality of buffer elements to a last buffer element of the plurality of buffer elements; a linear main pipeline comprising N pipeline stage elements arranged in series, wherein each pipeline stage element is connected to the last buffer element of a respective linear pipeline; the method comprising:

reading-out all buffered data bit sequences or a predefined number of data bit sequences from a respective last buffer element of a plurality of buffer elements before forwarding another data bit sequence from a previous N pipeline stage element comprised in N pipeline stage elements of a linear pipeline; and/or forwarding data bit sequences from the previous N pipeline stage element before reading-out another data bit sequence from a respective last buffer element of a plurality of buffer elements;

wherein the reading-out is performed sequentially; and wherein each pipeline stage element reads-out all buffered data bit sequences from a respective last buffer element of a plurality of buffer elements before forwarding another data bit sequence from the previous N pipeline stage element such that a continuous data stream is generated by the linear main pipeline forwarding the read-out data bit sequences; and/or wherein each pipeline stage element forwards all data bit sequences from the previous N pipeline stage element before reading-out another data bit sequence from a respective last buffer element of a plurality of buffer elements such that a continuous data stream is generated by the linear main pipeline forwarding the read-out data bit sequences, when said computer program is run by a computer.

* * * * *